United States Patent
Hattori et al.

(10) Patent No.: US 7,156,649 B2
(45) Date of Patent: Jan. 2, 2007

(54) MOLD FOR INJECTION MOLDING AND A METHOD OF OPERATING A MOLD

(75) Inventors: Naoya Hattori, Yokkaichi (JP); Seiichi Kurosawa, Yokkaichi (JP); Shinsuke Tsutsui, Yokkaichi (JP); Toshiya Muraki, Yokkaichi (JP); Yumiko Muramoto, Yokkaichi (JP)

(73) Assignee: Sumitomo Wiring Systems, Ltd. (JP)

( * ) Notice: Subject to any disclaimer, the term of this patent is extended or adjusted under 35 U.S.C. 154(b) by 0 days.

(21) Appl. No.: 10/910,897

(22) Filed: Aug. 4, 2004

(65) Prior Publication Data

US 2005/0031729 A1 Feb. 10, 2005

(30) Foreign Application Priority Data

Aug. 6, 2003 (JP) ............... 2003-287415

(51) Int. Cl.
*B29C 35/00* (2006.01)
(52) U.S. Cl. .............. 425/554; 425/556; 425/286; 425/151; 425/185; 425/195 R
(58) Field of Classification Search ........... 425/554, 425/556, 286, 151, 185, 195 R
See application file for complete search history.

(56) References Cited

U.S. PATENT DOCUMENTS

| | | | | | |
|---|---|---|---|---|---|
| 5,472,335 | A | * | 12/1995 | Morikita | 425/556 |
| 5,658,600 | A | * | 8/1997 | Okada et al. | 425/192 R |
| 6,171,539 | B1 | * | 1/2001 | Sakata | 264/295 |
| 6,206,681 | B1 | * | 3/2001 | Kawase et al. | 425/517 |
| 6,315,544 | B1 | * | 11/2001 | Burger et al. | 425/151 |
| 6,575,730 | B1 | * | 6/2003 | Muller | 425/556 |
| 6,638,054 | B1 | * | 10/2003 | Yamashita et al. | 425/556 |
| 6,837,700 | B1 | * | 1/2005 | Chen | 425/556 |
| 2004/0071815 | A1 | * | 4/2004 | Chen | 425/556 |
| 2004/0109913 | A1 | * | 6/2004 | Drees | 425/556 |
| 2005/0280188 | A1 | * | 12/2005 | Cecchin et al. | 264/334 |

FOREIGN PATENT DOCUMENTS

| | | |
|---|---|---|
| DE | 196 16 008 C | 6/1997 |
| JP | 58 078734 | 5/1983 |
| JP | 60 157822 | 8/1985 |
| JP | 5-245888 | 9/1993 |
| JP | 10 180805 | 7/1998 |
| JP | 11 090959 | 4/1999 |
| JP | 11-151735 | 6/1999 |

* cited by examiner

*Primary Examiner*—Robert Davis
*Assistant Examiner*—G. Nagesh Rao
(74) *Attorney, Agent, or Firm*—Gerald E. Hespos; Anthony J. Casella

(57) ABSTRACT

A fixed mold (10) has engaging pins (17) projecting towards a movable mold (20). Each engaging pin (17) includes a shaft (17A) and a large-diameter portion (17C) formed at the leading end of the shaft (17A). The large-diameter portions (17C) of the engaging pins (17) interfere with the bottom surfaces of recesses (53) of an ejector plate (50) in the process of separating the movable mold (20). Thus, the ejector plate (50) is moved forward relative to the movable mold (20) and leading ends of ejector pins (90) project from the movable mold (20).

6 Claims, 4 Drawing Sheets

MOLD FOR INJECTION MOLDING AND A METHOD OF OPERATING A MOLD

BACKGROUND OF THE INVENTION

1. Field of the Invention

The invention relates to a mold for injection molding and to a method of operating a mold for injection molding.

2. Description of the Related Art

Japanese Unexamined Patent Publication No. H05-245888 and Japanese Unexamined Patent Publication No. H11-151735 disclose a typical resin injection molding process. The known process starts with a movable mold closed relative to a fixed mold to define a cavity therebetween. The process continues by filling a molten resin into the cavity between the fixed and movable molds, and cooling the resin to solidify it. The movable mold then is separated from the fixed mold. An ejector pin then is driven from its initial position to a thrust-out position, thereby taking a molded article out of the mold. The ejector pin then is returned to the initial position, and the movable mold is moved towards the fixed mold to close the mold again.

The above-described step of removing the molded article from the mold must follow the mold-opening step. Thus, time is required to open the mold and additional time is required to take the molded article out of the mold. Further, the molding apparatus requires an ejecting device with a hydraulic cylinder for moving the ejector pin. The ejecting device requires considerable space.

The present invention was developed in view of the above problems and an object thereof is to shorten a molding cycle and to make a mold and a molding apparatus smaller.

SUMMARY OF THE INVENTION

The invention relates to an apparatus for injection molding. The apparatus comprises a fixed mold and a movable mold that is movable with respect to the fixed mold. The apparatus also has an ejector and an ejector plate. The ejector functions to thrust a molded article out the movable mold. The ejector plate is movable with respect to the movable mold and supports the ejector. The fixed mold includes an engaging member that directly or indirectly engages an ejector plate in the process of opening the mold. Thus, the ejector plate is moved forward relative to the movable mold and causes a leading end of the ejector to project from the movable mold. Accordingly, the molded article can be taken out during a mold opening step, and it is unnecessary to take the molded article in a separate step. As a result, the molding cycle is shortened. Further, the ejector is thrust out from the movable mold due to engagement of the engaging member and the ejector plate. Therefore, it is unnecessary to have a separate ejecting device for moving the ejector forward and back, and the molding apparatus can be smaller.

The engaging member preferably is an engaging pin that projects towards the movable mold.

The ejector plate preferably is mounted to the movable mold for forward and backward movement.

The ejector preferably is an ejector pin.

The ejector plate preferably has an engaging hole that can receive a shaft of the engaging member. The shaft preferably has a projection with a cross-sectional dimension larger than the inner diameter of the engaging hole. Thus, the projection can interfere with the opening edge of the engaging hole of the ejector plate. Accordingly, the projection of the engaging member engages the ejector plate to achieve the thrusting-out movement of the ejector.

The movable mold preferably has an insertion hole that communicates with the engaging hole in the ejector plate. The insertion hole in the movable mold permits entry and exit of the leading end of the engaging member. Accordingly, the engaging member is not entirely in the mold, and the mold is even smaller.

The ejector plate may be biased against the movable mold by a biasing member. However, the ejector plate can be moved relative to the movable member by engagement of the engaging member with the ejector plate.

The engaging member preferably has a coupling and can be separated into two or more pieces.

The invention also relates to a method of operating a mold, such as the above-described mold. The method comprises moving a movable mold with respect to a fixed mold to open the mold. Simultaneously, the method includes engaging an engaging member on the fixed mold with an ejector plate and thus moving the ejector plate with respect to the movable mold. The movement of the ejector plate causes a leading end of an ejector to project from the movable mold and thrusts the molded article from the mold.

The method may further comprises a step of holding the ejector plate substantially in contact with the movable mold by the biasing force of a biasing member and then moving the ejector plate relative to the movable member due to the engagement of the engaging member with the ejector plate.

The leading end of the engaging member preferably is inserted into and retracted from an insertion hole of the movable mold.

These and other objects, features and advantages of the present invention will become more apparent upon reading of the following detailed description of preferred embodiments and accompanying drawings. It should be understood that even though embodiments are separately described, single features thereof may be combined to additional embodiments.

DETAILED DESCRIPTION OF THE PREFERRED EMBODIMENT

Figure 1:
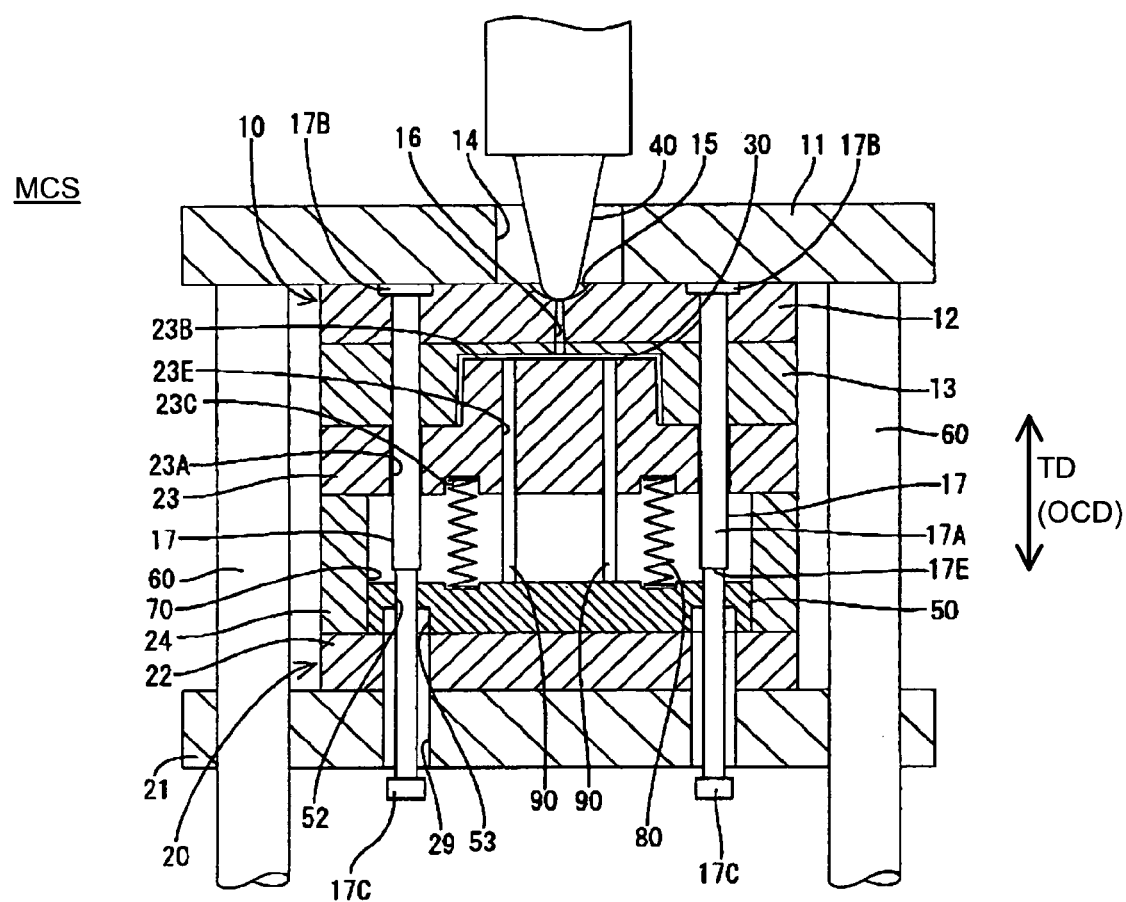
FIG. 1 is a section showing a closed state of a mold for injection molding according to one embodiment of the invention.

A mold for injection molding according to the invention a fixed mold 10 and a movable mold 20, as shown in FIG. 1 to 4. The movable mold 20 is movable towards the fixed mold 10 to close a cavity 30. The movable mold 20 also can be moved away from the fixed mold 10 to open the cavity 30.

The fixed mold 10 includes a fixed platen 11 fixed to a molding apparatus, a fixed mounting plate 12 mounted on the fixed platen 11, and a fixed molding plate 13 mounted on the fixed mounting plate 12. The fixed platen 11 has a through hole 14 that receives an injection nozzle 40, and the fixed mounting plate 12 has a resin inflow opening 15 that communicates with the through hole 14. The resin inflow opening 15 has a concave surface. A gate 16 extends from the resin inflow opening 15 through the fixed molding plate 13 and communicates with the cavity 30. The gate 16 has a smaller diameter than the resin inflow opening 15.

Engaging pins 17 project from the fixed mold 10 towards the movable mold 20 and are substantially symmetrically disposed with respect to the center of the fixed mold 10. Each engaging pin 17 has a shaft 17A extending substantially straight along its longitudinal direction. A collar 17B bulges out from the base end of the shaft 17A and is exposed at a surface of the fixed mounting plate 12 substantially facing the fixed platen 11. A large-diameter portion 17C bulges out at the leading end of the shaft 17A. The shafts 17A of the engaging pins 17 have lengths to penetrate from the fixed mold 10 to the movable mold 20 substantially along the thickness direction TD or the opening and closing direction OCD of the molds 10, 20. A coupling 17E is formed at an intermediate position with respect to the longitudinal direction of the shaft 17A of each engaging pin 17, and is provided with a screw fastening function. The engaging pin 17 can be divided at this coupling portion 17E.

Guiding bars 60 are secured to the fixed platen 11 and extend towards the movable mold 20. The guiding bars 60 are at the outer sides of the fixed mounting plate 12 and the fixed molding plate 13 and are substantially parallel with the shafts 17A of the engaging pins 17.

The movable mold 20 is movable along the guiding bars 60 between a mold-closing position where the movable mold 20 contacts the fixed molding plate 13 and a mold-opening position spaced from the mold-closing position. The movable mold 20 includes a movable platen 21, a movable mounting plate 22 mounted on the movable platen 21, a movable molding plate 23 spaced from the movable mounting plate 22 by a specified distance, and a spacer 24 between the movable molding plate 23 and the movable mounting plate 22. An accommodating section 70 is provided in an inner space that is held with a specified dimension by the spacer 24.

An ejector plate 50 is movable forward and backward substantially along the opening and closing direction OCD between the movable mounting plate 22 and the movable molding plate 23. The ejector plate 50 is biased away from the fixed mold 10 by springs 80, such as compression coil springs, incorporated into the accommodating section 70 of the movable mold 20 between the ejector plate 50 and the movable molding plate 23. Ejector pins 90 project from the ejector plate 50 towards the fixed mold 10 and are substantially symmetrically disposed around the center of the ejector plate 50. Base ends of the ejector pins 90 are mounted fixedly to the ejector plate 50.

The ejector plate 50 has engaging holes 52 at positions corresponding to the engaging pins 17. Each engaging hole 52 has an inner diameter substantially equal to the outer diameter of the shaft 17A so that the shaft 17A can be inserted through the engaging hole 52. One end of each engaging hole 52 communicates with the accommodating section 70. The other end of each engaging hole 52 communicates with a recess 53 that is exposed toward the movable mounting plate 22. The recess 53 has a diameter larger than the engaging hole 52. The large-diameter portion 17C of the engaging pin 17 contacts the bottom surface of the recess 53 adjacent the opening edge of the engaging hole 52 in the process of separating the movable mold 20 from the fixed mold 10 during the mold opening. The movable mold 20 is moved further back and away from the fixed mold 10. As a result, the large-diameter portions 17C of the engaging pins 17 interfere with the bottom surfaces of the recesses 53. Accordingly, the ejector plate 50 is moved forward relative to the movable mold 20 and against biasing forces of the springs 80.

The movable molding plate 23 has through holes 23A that loosely receive the shafts 17A of the engaging pins 17. The movable molding plate 23 also has an attachment surface 23B facing the cavity 30 for receiving a molded article S. Spring holding portions 23C are formed in a surface of the movable molding plate 23 facing the accommodation space 70 for accommodating ends of the springs 80. Guiding holes 23E extend through the movable holding plate 23 for guiding the respective ejector pins 90. The leading ends of the ejector pins 90 are substantially flush with or slightly retracted from the attachment surface 23B of the movable molding plate 23 when the mold is closed. The engaging pins 17 interfere with the ejector plate 50 in the process of separating the movable mold 20 from the fixed mold 10, and the interference moves the ejector plate 50 forward relative to the movable mold 20 as the mold is opened. Thus, the leading ends of the ejector pins 90 project from the attachment surface 23B of the movable molding plate 23.

Insertion holes 29 penetrate both the movable mounting plate 22 and the movable platen 21 in the thickness direction TD and communicate with the recesses 53 of the ejector plate 50. Leading ends of the engaging pins 17 can enter and exit from the insertion holes 29 as the movable mold 20 makes a relative movement. The inner diameter of the insertion holes 29 is substantially equal to that of the recesses 53. Thus, the large-diameter portions 17C of the engaging pins 17 are insertable into the insertion holes 29. The insertion holes 29, the engaging holes 52, the recesses 53 and the through holes 23A are arranged substantially coaxially along the corresponding shafts 17A of the engaging pins 17.

The mold is closed by moving the movable mold 20 towards the fixed mold 10. In this mold-closed state MCS, as shown in FIG. 1, the cavity space 30 is defined between the movable molding plate 23 of the movable mold 20 and the fixed molding plate 13 of the fixed mold 10. The biasing forces of the springs 80 hold the ejector plate 50 substantially in contact with the movable mounting plate 22 of the movable mold 20. The large-diameter portions 17C of the engaging pins 17 are exposed to the outside through the insertion holes 29 of the movable platen 21. The couplings 17E define boundaries between the leading-ends and base-ends of the engaging pins 17. The leading-ends are inserted into the mold through the insertion holes 29 and the large-diameter portions 17C are fixed (preferably screwed) after the mold is closed.

Figure 2:
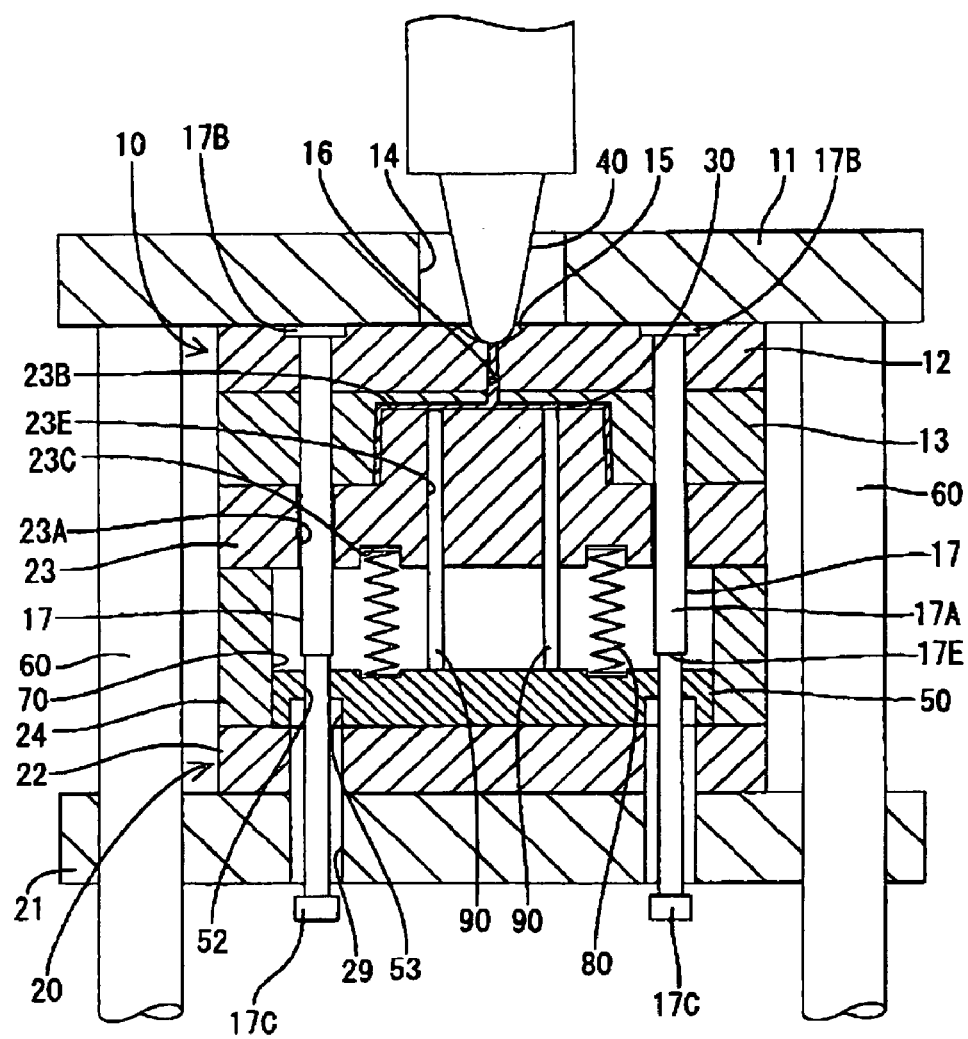
FIG. 2 is a section showing a molten resin is filled into a cavity.
Figure 3:
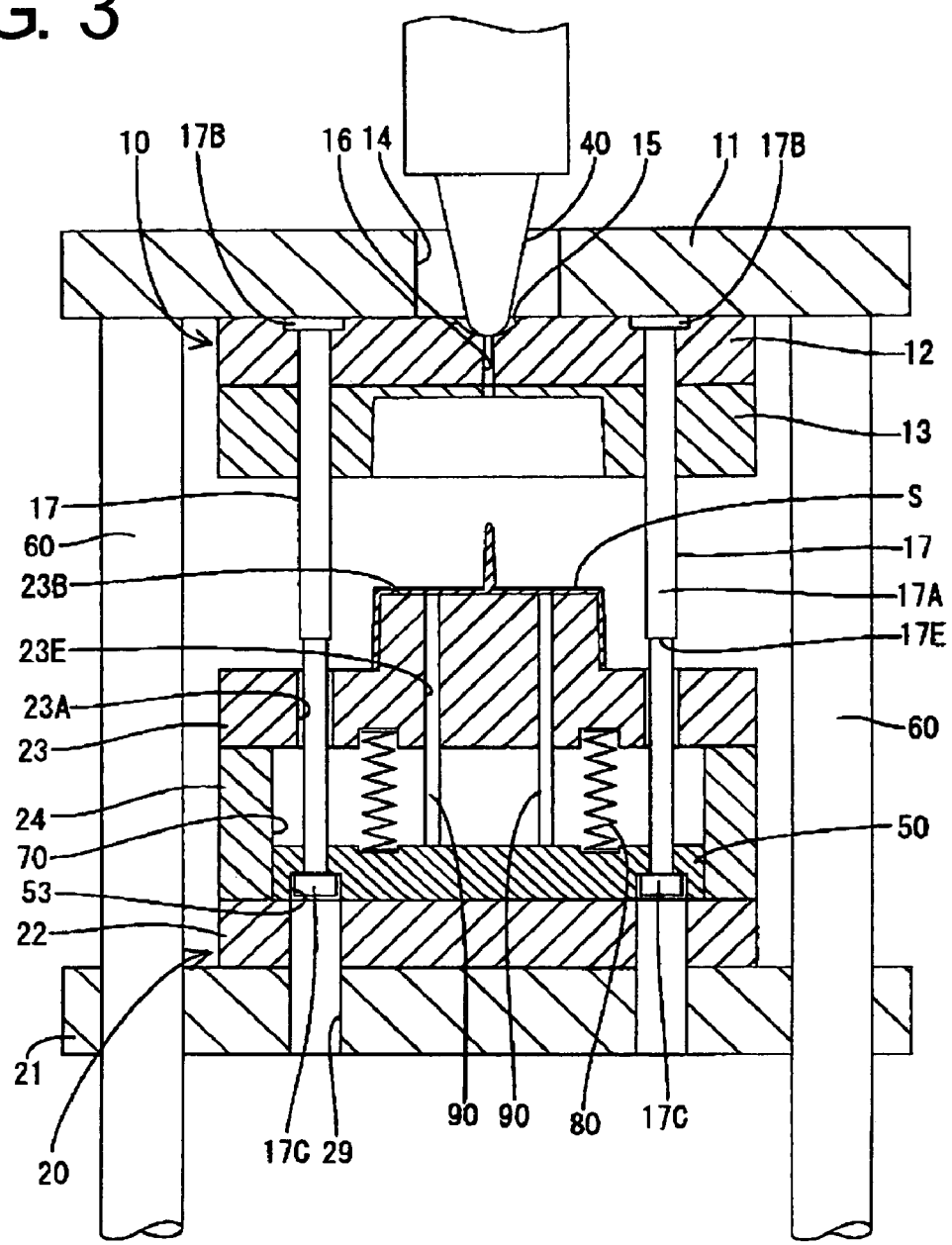
FIG. 3 is a section showing an intermediate state of the separation of a movable mold from a fixed mold.
Figure 4:
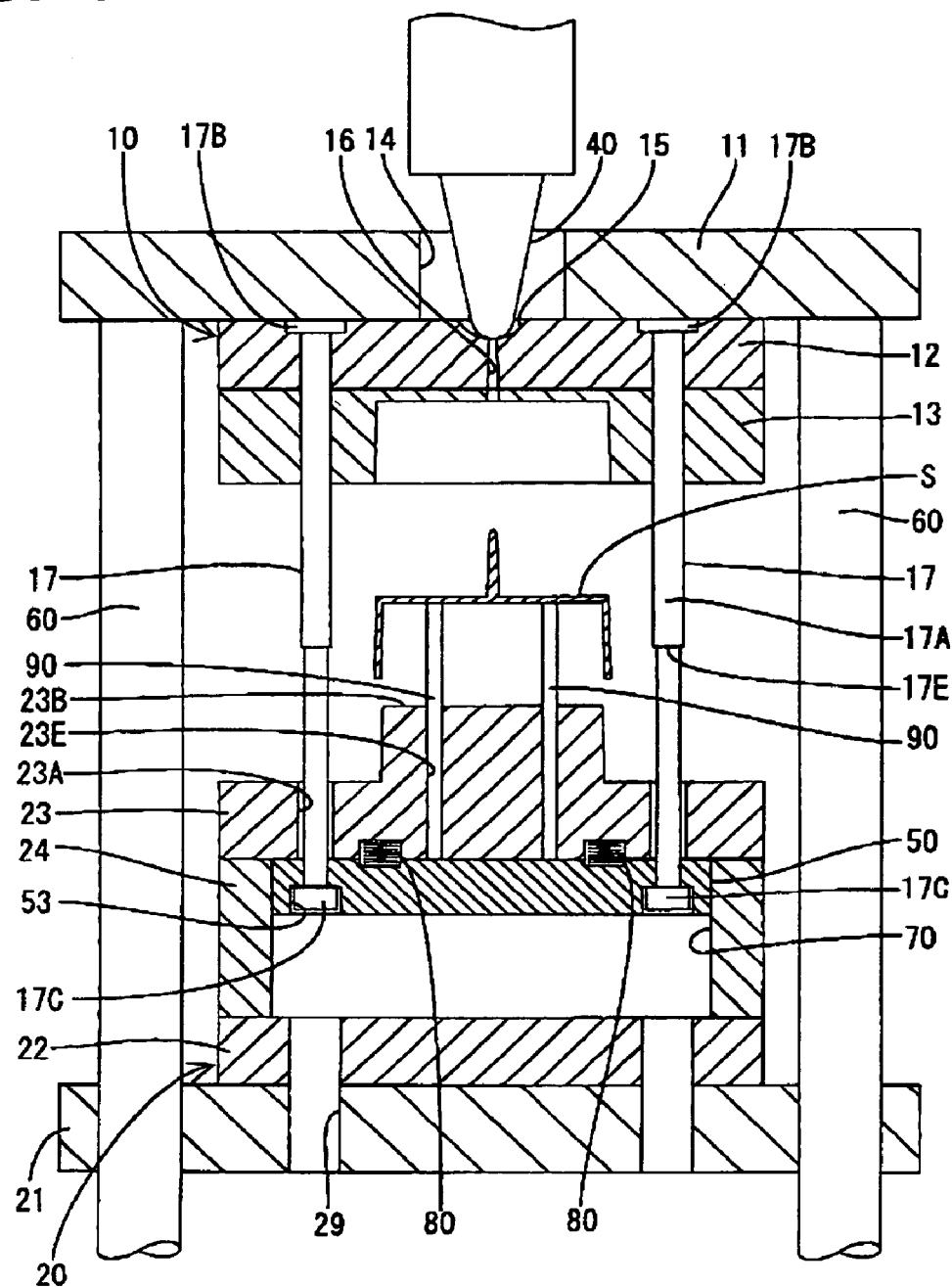
FIG. 4 is a section showing a thrust-up state.

A molten resin is injected from the injection nozzle 40 through the resin inflow opening 15 and the gate 16 and into the cavity, as shown in FIG. 2. The resin then is cooled sufficiently to solidify. The movable mold 20 then is slid along the guiding bars 60 by an unillustrated driving mechanism and is separated from the fixed mold 10. The engaging pins 17 do not interfere with the ejector plate 50 at the start of moving the movable mold 20. Thus, the ejector plate 50 is not displaced relative to the movable mold 20 at the start of moving the movable mold 20. The large-diameter portions 17c of the engaging pins 17 engage the bottom surfaces of the recesses 53 of the ejector plate 50 when the movable mold 20 is displaced by about half the entire movement stroke, as shown in FIG. 3. Further backward movement of the movable mold 20 causes the ejector plate 50 to move forward relative to the movable mold 20. Thus, the ejector pins 90 supported on the ejector plate 50 gradually project from the attachment surface 23B of the movable mold 20.

The ejector pins 90 thrust the molded article S up and away from the movable mold 20 when the ejector plate 50 reaches a mold opening position where it contacts the movable molding plate 23 of the movable mold 20. The molded article S then is taken out and the movable mold 20 is brought closer to the fixed mold 10. The biasing forces of the springs 80 then automatically return the ejector plate 50 to the initial position where it contacts the movable molding plate 22.

As described above, the engaging pins 17 that project from the fixed mold 10 interfere with the ejector plate 50 in the process of separating the movable mold 20 from the fixed mold 10. Thus, the ejector plate 50 is moved forward relative to the movable mold 20 and the leading ends of the ejector pins 90 project from the movable mold 20. Accordingly, the molded article S can be taken out in the mold opening step rather than in a separate step. As a result, the molding cycle is shortened. Further, the ejector pins 90 project from the movable mold 20 due to interference of the ejector plate 50 and the engaging pins 17. Therefore, it is not necessary to provide a separate ejecting device for moving the ejector pins 90, and the molding apparatus can be smaller.

The large-diameter portions 17C at the leading ends of the shafts 17A of the engaging pins 17, have a larger diameter than the inner diameter of the respective engaging holes 52 of the ejector plate 50 and interfere with the bottom surfaces of the recesses 53 of the ejector plate 50. Thus, the engaging pins 17 directly engage the ejector plate 50 to achieve the projecting movements of the ejector pins 90.

The movable mold 20 has the insertion holes 29 that communicate with the engaging holes 52 via the recesses 53 to permit the entry and exit of the leading ends of the engaging pins 17. Thus, the engaging pins 17 need not be accommodated entirely in the mold, and the movable mold 20 is even smaller.

The invention is not limited to the above described and illustrated embodiment. For example, the following embodiments also are embraced by the invention as defined by the claims. Various other changes can be made without departing from the scope of the invention as defined by the claims.

Engageable pins or members may project from the ejector plate towards the fixed mold and the engaging pins may catch the respective engageable pins in the process of separating the movable mold from the fixed mold.

One or more than two engaging pins or members may project from the fixed mold.

The ejector plate may be formed with a portion that can interfere with the engaging pin, and the recesses may not be formed.

The illustrated shaft 17A has the large diameter portion 17C. However the invention also covers an embodiment where a pin or like projection projects radially from shaft 17A for to engaging an edge of the engaging hole 52.

What is claimed is:

1. A mold for injection molding, comprising:
a fixed mold;
a movable mold disposed for substantially linear movement along a moving direction towards the fixed mold and into a closed position and away from the fixed mold to a fully opened position, the movable mold having an attachment surface facing towards the fixed mold for defining a mold cavity when the movable mold is moved towards the fixed mold and into the closed position;
an ejector plate movable with respect to the movable mold towards and away from the mold cavity;
at least one ejector attached fixedly to the ejector plate and passing through at least part of the movable mold at least to the attachment surface for thrusting a molded article away from the attachment surface when the movable mold is moved away from the fixed mold; and
a plurality of engaging members projecting rigidly from the fixed mold and extending substantially parallel to the moving direction of the movable mold, the engaging members being disposed substantially symmetrically with respect to a center of the fixed mold and passing completely through the ejector plate when the movable mold is in the closed position, the engaging members being configured for directly engaging the ejector plate for limiting movement of the ejector plate away from the fixed mold as the movable mold is moved away from the fixed mold and towards the fully opened position, whereby the engaging members limits movement of the ejector plate as the movable mold moves away from the fixed mold towards the fully opened position and thereby causes a leading end of the ejector to project from the attachment surface of the movable mold.

2. The mold for injection molding of claim 1, wherein the engaging members projects through the movable mold.

3. The mold for injection molding of claim 1, wherein the ejector plate has engaging holes, a shaft of each of the engaging members being inserted through the respective engaging hole, each of the engaging members further having a projection dimensioned for directly engaging portions of the ejector plate in proximity to the respective engaging hole as the movable mold is moved away from the fixed mold.

4. The mold for injection molding of claim 1, wherein the movable mold has insertion holes communicating respectively with the engaging holes and dimensioned for receiving a corresponding one of the engaging members therein.

5. The mold for injection molding of claim 1, wherein the ejector plate is biased against the movable mold by a biasing member and is movable relative to the movable members by engagement of the engaging member with the ejector plate.

6. The mold for injection molding of claim 1, wherein each of the engaging members comprises a coupling configured to be dismounted in at least two pieces.

* * * * *